(12) United States Patent
Marui et al.

(10) Patent No.: US 7,363,901 B2
(45) Date of Patent: Apr. 29, 2008

(54) ENGINE VALVE, METHOD OF MANUFACTURING SAME, AND CYLINDER HEAD INCORPORATING SAME

(75) Inventors: Yuji Marui, Saitama (JP); Naoya Okamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/515,704

(22) Filed: Sep. 5, 2006

(65) Prior Publication Data

US 2007/0068477 A1    Mar. 29, 2007

(30) Foreign Application Priority Data

Sep. 27, 2005    (JP) .............. 2005-279441

(51) Int. Cl.
*F02N 3/00* (2006.01)
*F02F 1/00* (2006.01)

(52) U.S. Cl. ................. 123/188.3; 123/188.9

(58) Field of Classification Search ......... 123/188.1, 123/188.2, 188.3, 188.4, 188.9; 29/888.4, 29/888.41, 888.43, 888.44
See application file for complete search history.

(56) References Cited

U.S. PATENT DOCUMENTS

| | | | |
|---|---|---|---|
| 4,675,964 A | | 6/1987 | Allison |
| 4,729,546 A | | 3/1988 | Allison |
| 4,852,531 A | * | 8/1989 | Abkowitz et al. ....... 123/188.3 |
| 5,304,263 A | | 4/1994 | Champin et al. |
| 5,517,956 A | * | 5/1996 | Jette et al. ............... 123/188.3 |
| 5,662,745 A | | 9/1997 | Takayama et al. |
| 5,819,774 A | * | 10/1998 | Beardsley et al. ............. 137/1 |
| 6,131,603 A | * | 10/2000 | Takano et al. .............. 137/375 |
| 6,354,001 B1 | | 3/2002 | Asanuma |
| 6,718,932 B1 | * | 4/2004 | Cecur et al. ............. 123/188.3 |
| 6,912,984 B2 | * | 7/2005 | Narasimhan et al. ..... 123/188.3 |
| 2006/0180115 A1 | * | 8/2006 | Rubert .................... 123/188.8 |
| 2007/0039585 A1 | * | 2/2007 | Rubert .................... 123/188.3 |

FOREIGN PATENT DOCUMENTS

| | | |
|---|---|---|
| EP | 0 608 431 | 8/1994 |
| JP | 01-028347 | 1/1989 |
| JP | 05-279835 | 10/1993 |
| JP | 2001-234313 | 8/2001 |

* cited by examiner

*Primary Examiner*—Hai Huynh
(74) *Attorney, Agent, or Firm*—Carrier, Blackman + Associates, P.C.; William D. Blackman; Joseph P. Carrier

(57) ABSTRACT

An engine valve, formed of a titanium alloy, enables improvement of reliability and productivity while improving creep resistance and fatigue strength at a high temperature. The engine valve, including a stem section and a bevel section provided at one end of the stem section, is integrally formed of the titanium alloy. A portion of the valve, extending from the bevel section to a medial portion of the valve stem, is formed mainly of a needle-like crystallographic texture. Another portion of the valve, extending from the medial section to the other end of the stem section, is formed of a material having a substantially equiaxed crystallographic texture. A boundary between the needle-like texture and the equiaxed texture is provided in a range of sliding movement of the valve relative to a valve guide that slidably guides the stem section within the cylinder head.

14 Claims, 3 Drawing Sheets

US 7,363,901 B2

ENGINE VALVE, METHOD OF MANUFACTURING SAME, AND CYLINDER HEAD INCORPORATING SAME

CROSS-REFERENCE TO RELATED APPLICATIONS

The present invention claims priority under 35 USC 119 based on Japanese Patent Application No. 2005-279441, filed on Sep. 27, 2005. The subject matter of this priority document is incorporated by reference herein.

BACKGROUND OF THE INVENTION

1. Field of the Invention

The present invention relates to an engine valve formed of titanium alloy used for an internal combustion engine, the engine used, for example, in an automotive vehicle. The present invention also relates to a method of making the engine valve, and to a cylinder head incorporating the valve.

2. Description of the Background Art

Hitherto, in order to improve a performance of an engine, attempts have been made to increase the engine's usable rotary speed range. The largest obstacle for enhancing the permissible number of engine revolutions over a period of time is an increase in inertial mass of a valve system. In other words, an increase in the inertial mass of the valve system causes reduced capability of an engine valve to follow a cam as the engine rotary speed is increased, which may result in reducing engine output or the like. Therefore, in order to achieve an increase in engine rotary speed, reduction of the inertial mass of the valve system is important. In particular, reduction of the weight of the engine valves, such as an air-intake valve or an exhaust valve, which occupy a large portion of the mass of the components of the valve system, is extremely effective for increasing the engine rotary speed.

Therefore, recently, in order to reduce the weight of the engine valve, engine valves have been formed of a titanium alloy which is low in weight and high in strength, instead of heat-resisting steel used in the related art. For example, in JP-A-2001-234313, a technology to manufacture an engine valve formed of titanium alloy is disclosed. The disclosed engine valve includes a stem section and a bevel section formed integrally to each other by hot-forging. More specifically, in JP-A-2001-234313, a method is proposed in which a bevel section is formed of a needle-like (acicular) α crystallographic texture at an end of the stem section by forming an enlarged diameter section at an end of the stem section formed of an equiaxed α crystallographic texture at a temperature exceeding a β transformation point, and then immediately hot-forging the enlarged diameter section.

In the manufacturing method described in JP-A-2001-234313, the enlarged diameter section, which is formed into the needle-like texture, is formed by upset forging the end of a shaft-shaped member with an electric setting machine, and then immediately forging the enlarged diameter section. As a result, the following problems occur: Shrinkage may easily occur at the enlarged diameter section at the time of upset, and forging defects such as shrinkage, cracking, or entrainment may also easily occur on the formed bevel section when forging the enlarged diameter section.

In the engine valve manufactured by this manufacturing method, a boundary is formed between the above-described needle-like texture and the equiaxed texture at a boundary (neck portion) between the stem section and the bevel section, where a stress is intensively applied due to its shape. As a result, the strength at the neck portion may be lowered. In order to secure the strength of the neck portion, where a stress is intensively applied, a countermeasure such as enlarging the diameter of the neck portion is necessary. However, such enlargement results in increase in weight of the engine valve.

In addition, in the method of manufacturing the engine valve, since a positional accuracy of the boundary between the needle-like texture and the equiaxed texture is not high, an increased in the variation in strength of components of the manufactured engine valve occurs.

Therefore, the present invention is proposed in view of the above described circumstances in the related art, and it is an object of the invention is to provide an engine valve formed of titanium alloy which further improves manufacturing reliability and productivity while improving valve creep resistance and a fatigue strength at a high temperature.

SUMMARY

As a solution to the above-described problems, a first aspect of the invention is directed to an engine valve including a stem section, and a bevel section (valve head) provided at one end of the stem section. The stem and bevel sections are formed integrally of titanium alloy. A portion of the valve from the bevel section to a medial part of the stem section is formed mainly of a needle-like crystallographic texture, and a portion of the valve from the medial section to the other end of the stem section is formed of a material having a substantially equiaxed crystallographic texture. A boundary between the needle-like texture and the equiaxed texture is provided at a portion of the valve corresponding to a range of sliding movement of the valve relative to a valve guide that slidably guides the stem section within the cylinder head.

In this arrangement, by providing the boundary between the needle-like texture and the equiaxed texture at a portion of the valve corresponding to the range of sliding movement, the boundary section avoids application of intensive stress, whereby reliability is improved.

By forming the stem section mainly of the equiaxed texture, and the bevel section mainly of the needle-like texture, the creep resistance and the fatigue strength at a high temperature required for the engine valve is further improved.

A second aspect of the invention includes the features of the first aspect thereof, and is further characterized in that the needle-like texture is formed by hot-forging a titanium alloy formed mainly of the equiaxed texture at a temperature not exceeding a β transformation point to form the bevel section at one end of the stem section, and heating a portion from the bevel section to the medial part of the stem section with a high frequency at a temperature exceeding the β transformation point.

In this arrangement, since the titanium alloy, formed mainly of the equiaxed texture, is forged to form the bevel section at one end of the stem section before converting the bevel section into the needle-like texture, the engine valve can be machined and molded easily.

By heating the portion from the bevel section to the medial part of the stem section with a high frequency, the boundary between the needle-like texture and the equiaxed texture can easily be set to a desired position. Therefore, variations in strength of the components of the manufactured engine valve can be constrained.

As described above, according to the invention, the light and inexpensive engine valve formed of titanium alloy is obtained in which reliability and productivity is improved while achieving improvement of the creep resistance and the fatigue strength at a high temperature.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION OF ILLUSTRATIVE EMBODIMENTS

Figure 1:
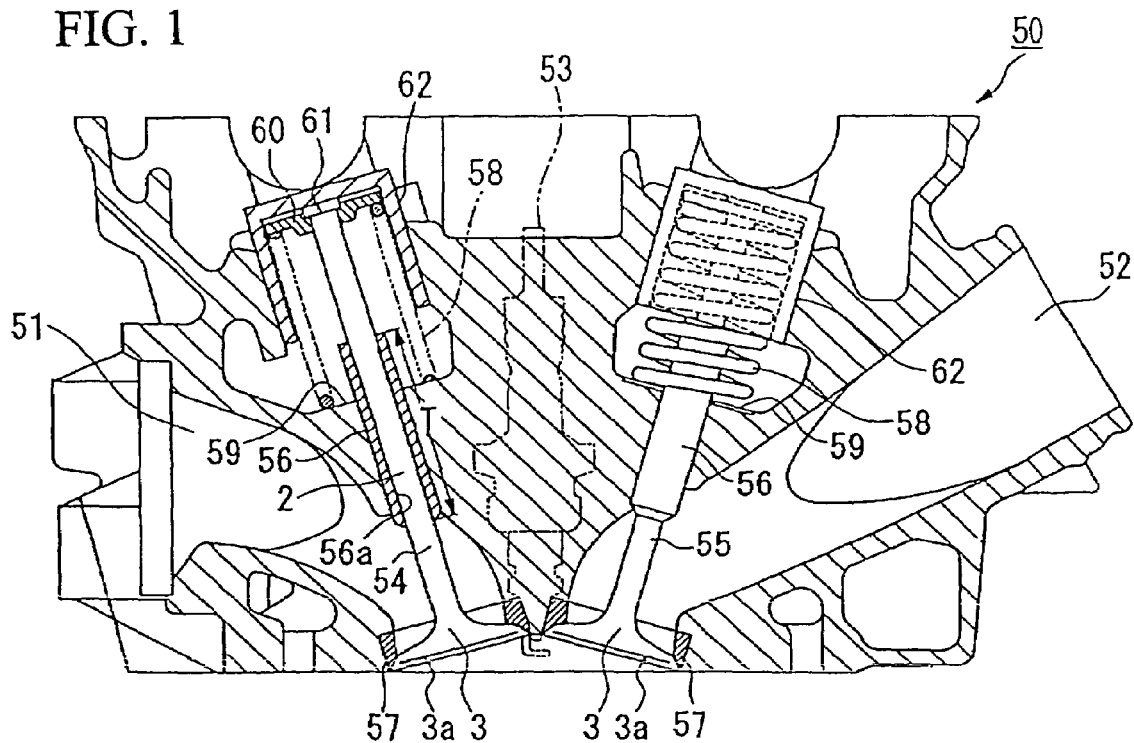
FIG. 1 is a cross-sectional view of a cylinder head showing an air intake valve and an exhaust valve according to an illustrative embodiment of the present invention.

A selected illustrative embodiment of an engine valve and cylinder head to which the invention is applied will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art.

A cylinder head 50, which constitutes a portion of a valve system of an internal combustion engine, shown in FIG. 1, will be described first.

The cylinder head 50 is provided with an air-intake port 51 and an exhaust port 52 which communicate, respectively, with a combustion chamber of a cylinder block (not shown) in the assembled engine. A gaseous air-fuel mixture is drawn in through the air-intake port 51 and into the combustion chamber. After combustion, exhaust gas from the combustion chamber is discharged through the exhaust port 52. A spark plug 53 is mounted between the air-intake port 51 and the exhaust port 52 of the cylinder head 50, so that the electrode of the spark plug extends into the combustion chamber.

The cylinder head 50 is provided with an air-intake valve 54 and an exhaust valve 55 for respectively opening and closing the openings of the air-intake port 51 and the exhaust port 52 on the combustion chamber side. The engine valve to which the invention is applied is used desirably for one or both of the air-intake valve 54 and the exhaust valve 55.

Therefore, in the description shown below, reference to the engine valve 1 (shown in FIG. 2) refers to either or both of the air-intake valve 54 and the exhaust valve 55.

Figure 2:
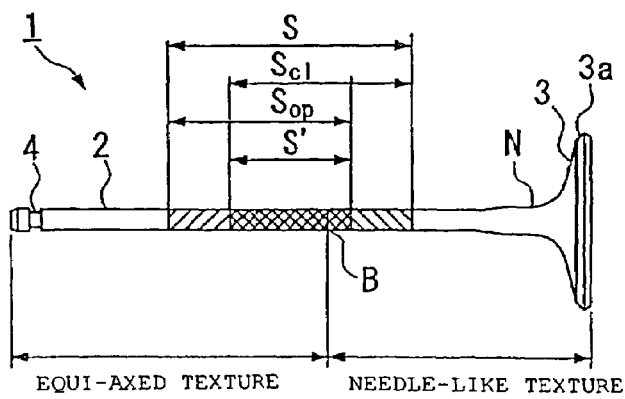
FIG. 2 is a plan view of an engine valve body showing the stem section formed mainly of the equiaxed texture, and the bevel section formed mainly of the needle-like texture, according to an illustrative embodiment of the present invention.

The engine valve 1 includes a stem section (valve stem) 2 and a valve head or bevel section 3 provided at one end of the stem section 2 as shown in FIG. 2. The valve also includes a tip end on the stem section 2, opposite the bevel section 3. An annular cotter groove 4 is formed in the valve stem near the tip end of the stem section 2, again opposite the bevel section 3.

The air-intake valve 54 and the exhaust valve 55, which each constitute the engine valve 1 as described above, are capable of sliding in a substantially axial direction (the direction to open and close the valves 54, 55) by inserting the stem sections 2 into bores 56a of valve guides 56. The valve guides 56 are press-fitted into the cylinder head 50 as shown in FIG. 1. Valve seats 57, with which the bevel sections 3 of the air-intake valve 54 and the exhaust valve 55 are brought into abutment, are respectively mounted to the openings of the air-intake port 51 and the exhaust port 52 on the side of the combustion chamber. As seen in FIG. 2, the bevel sections 3 of the engine valve 1 are provided with valve faces 3a which repeatedly come into sealing contact with the valve seats 57 during engine operation.

The cylinder head 50 is also provided with valve springs 58, for urging the air-intake valve 54 and the exhaust valve 55 upwardly (in the direction to close the valves 54, 55). The valve springs 58 are arranged in a state of being compressed between seat surfaces 59 on the side of the cylinder head 50 and valve retainers 60 mounted to upper ends of the stem sections 2 of the air-intake valve 54 and the exhaust valve 55. The valve retainers 60 are fixed to the upper ends of the stem sections 2 so as not to come apart therefrom by cotters 61 fitted into the cotter grooves 4.

Valve lifters 62 are mounted to upper ends of the air-intake valve 54 and the exhaust valve 55, respectively. Cam shafts (not shown) on the air-intake side and the exhaust side are rotatably provided above the valve lifters 62. The cam shafts on the air-intake side and the exhaust sides have cams which come into abutment with the valve lifters 62 on the air-intake side and the exhaust side, respectively, and press the valve lifters 62 downward against an urging force of the valve springs 58 following the movement of the rotating cams. Accordingly, the air intake valve 51 and the exhaust valve 52 open and close the openings of the air-intake port 51 and the exhaust port 52 on the side of the combustion chamber at predetermined timings.

The engine valve 1 to which the invention is applied includes the stem section 2 and the bevel section 3 formed integrally of titanium alloy.

The titanium alloy which can be used includes, for example,

Ti-6Al-2Sn-4Zr-1Nb-1Mo-0.2Si or Ti-6Al-2Sn-4Zr-2Mo, Ti-2.7Sn-4Zr-0.4Mo-0.45Si,

Ti-8Al-1Mo-1V, Ti-72SiCN as α+β type, near α type, and α type, and is not specifically limited thereto as long as it is titanium alloy to which the invention can be applied. In order to enhance abrasion resistance, a flexural strength, and the like of the titanium alloy, for example, the titanium alloy containing hard particles such as TiB (titanium boride) dispersed therein can also be used.

In order to improve the abrasion resistance of the titanium alloy, the engine valve 1 is heat-treated in an atmosphere containing oxygen (at a temperature lower than a β transformation point) so that an OD (oxygen diffused) treatment can be done on a surface of the engine valve 1. In addition, the surface of the engine valve 1 can be nitrided or cemented by a plasma cementation process, for example, and also can be metal-plated by ion-plating method including CrN, TiN, and the like.

Figure 3:
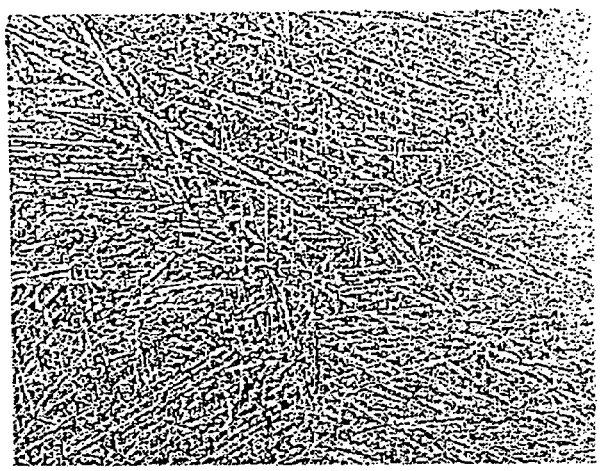
FIG. 3 is a photomicrograph showing an acicular or needle-like texture of titanium alloy.
Figure 4:
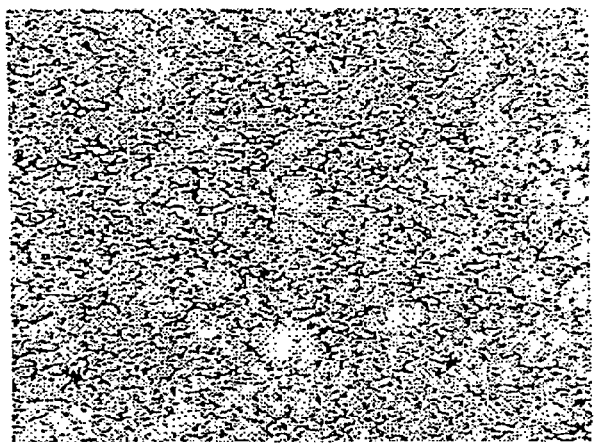
FIG. 4 is a photomicrograph showing an equiaxed texture of titanium alloy.

The engine valve 1 to which the invention is applied is characterized in that, as shown in FIG. 1 and FIG. 2, a portion of the valve extending from the bevel section 3 to a medial part of the stem section 2 is formed mainly of material having a columnar (acicular) or needle-like texture, as shown in FIG. 3. Another portion of the valve 1, extending from the medial section to the other end of the stem section 2, is formed mainly of material having an equiaxed texture as shown in FIG. 4, and a boundary B between the needle-like texture and the equiaxed texture is provided at a position of the valve corresponding to the range of sliding movement T of the valve relative to the valve guide 56 that slidably guides the stem section 2 within the cylinder head 50.

More specifically, the stem section 2 of the engine valve 1 includes an area S which slides relative to the valve guide 56. The area S is composed of an area Scl which is positioned in the range of sliding movement T of the valve guide 56 when the valve is closed, and an area Sop which is positioned in the range of sliding movement T of the valve guide 56 when the valve is opened. The range of sliding movement T of the valve guide 56 is an area of the valve guide 56 formed with a hole 56a, and the above-described boundary B between the needle-like texture and the equiaxed texture is preferably provided in the area Scl which is positioned in the range of sliding movement T of the valve guide 56 at least when the valve is closed.

Accordingly, the engine valve 1 can be prevented from receiving an intense stress at the boundary B between the needle-like texture and the equiaxed texture. In other words, by preventing the above-described boundary B between the needle-like texture and the equiaxed texture from being positioned at a neck portion N between the stem section 2 and the bevel section 3, where a stress is liable to be applied intensively due to the shape of the engine valve 1, lowering of strength of the engine valve 1 at the neck portion N, where the stress is intensively applied, can be prevented.

The boundary B between the needle-like texture and the equiaxed texture is preferably provided in an area S' where the area Scl, positioned in the range of sliding movement T of the valve guide 56 when the valve is closed, and the area Sop, positioned in the range of sliding movement T of the valve guide 56 when the valve is opened, are overlapped.

In this case, the boundary B between the needle-like texture and the equiaxed texture is constantly positioned in the range of sliding movement T of the valve guide 56 when the valve is opened and closed. In this case, since the shearing stress is not applied to the boundary B between the needle-like texture and the equiaxed texture, reliability and durability of the engine valve 1 can further be improved.

The engine valve 1 to which the invention is applied can be improved in the creep resistance and the fatigue strength at a high temperature, which is required for this engine valve 1, by forming the stem section 2 of the equiaxed texture and the bevel section 3 of the needle-like texture.

In general, titanium alloy has a strong texture dependency as the material characteristic, and the creep resistance is improved when it is formed of the needle-like texture. On the other hand, when it is formed of the equiaxed texture, forgeability and the fatigue strength are improved. Therefore, the creep resistance and the fatigue strength at a high temperature which are required for the engine valve 1 are both achieved by forming the stem section 2 of the equiaxed texture and the bevel section 3 of the needle-like texture. In particular, the desirable creep resistance of the bevel section 3 at a high temperature (700° C. or higher) which is an important issue of the exhaust valve 55 is achieved.

In the invention, provision of the above-described boundary B between the needle-like texture and the equiaxed texture in an area located within the range of sliding movement T of the valve guide 56 only when the valve is opened (area from Sop to S') is also contemplated. However, in this case, in the stem section 2 of the engine valve 1, the amount of the area formed of the needle-like texture is increased, and in contrast, the area of the equiaxed texture, having a smaller sliding resistance with respect to the valve guide 56 than the needle-like texture, is reduced. Therefore, lowering of the sliding property of the engine valve 1 results.

From these reasons, also in the area S' which is considered to be preferable for providing the above-described boundary B, the ratio of the equiaxed texture in the area S which slides with respect to the valve guide 56 of the stem section 2 is increased by providing the boundary B on the side of the bevel section 3 in the area S', so that slidability of the engine valve 1 can be improved. The boundary B can be provided in an area on the upper side of the neck portion N, that is, in an area between the end of the area S on the side of the bevel section 3 and the neck portion N, where the stress is intensively applied, when the area S, which is slid with respect to the valve guide 56 of the stem section 2, is entirely formed of the equiaxed texture so that slidability of the engine valve 1 is further improved.

Subsequently, a method of manufacturing the engine valve 1 to which the invention is applied will be described.

The method of manufacturing the engine valve 1 to which the invention is applied is characterized in that titanium alloy formed of the equiaxed texture is hot-forged at a temperature which does not exceed the β transformation point to form the bevel section 3 at an end of the stem section 2, then, the bevel section 3 is heated at a high frequency from the bevel section 3 to the medial part of the stem section 2 at a temperature exceeding the β transformation point to convert the heated portion into the needle-like texture.

In this method, since the bevel section 3 is formed at an end of the stem section 2 by forging the titanium alloy formed of the needle-like texture before converting the bevel section 3 into the needle-like texture, machining and molding of the engine valve 1 can be facilitated.

Also, the boundary B between the needle-like texture and the equiaxed texture can be set to a desired position easily by heating the portion from the bevel section 3 to the medial part of the stem section 2 at a high frequency.

Accordingly, variation in strength of the components of the manufactured engine valve 1 can be constrained, and hence productivity can be improved.

As described above, according to the invention, the light and inexpensive engine valve 1 can be obtained that is formed of titanium alloy in which reliability and productivity are further improved while achieving improvement of the creep resistance and the fatigue strength at a high temperature.

The effect of the invention is clarified by the examples shown below. The invention is not limited to the following examples, and may be implemented by modifying as needed as long as the scope of the invention is not changed.

Figure 5:
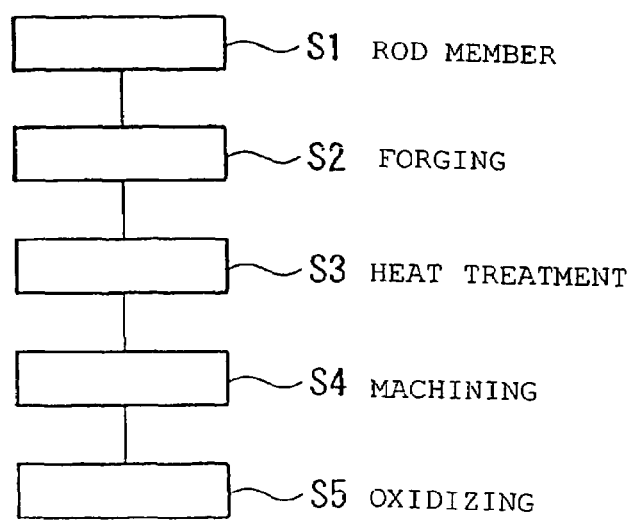
FIG. 5 is a process diagram showing an example of a process of manufacturing the engine valve.
Figure 6A:
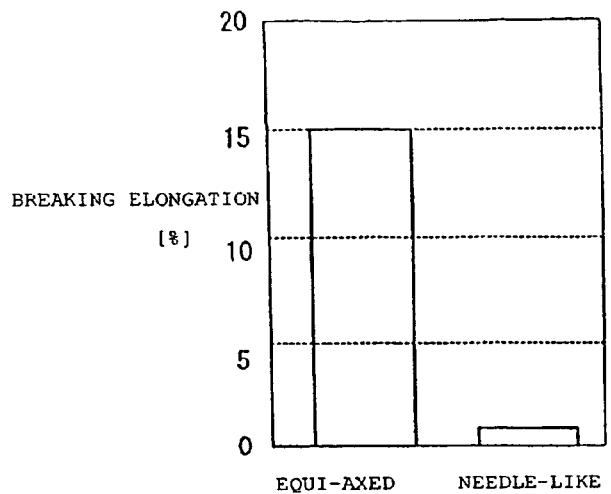
FIGS. 6(a)-6(d) are graphs comparing the mechanical characteristics of the equiaxed texture and the needle-like texture of the engine valve in the example, in which 6(a) shows breaking elongation, 6(b) shows impact value, 6(c) shows high temperature fatigue strength (No oxygen diffusion treatment), and 6(d) shows high temperature fatigue strength (with oxygen diffusion treatment).
Figure 6B:
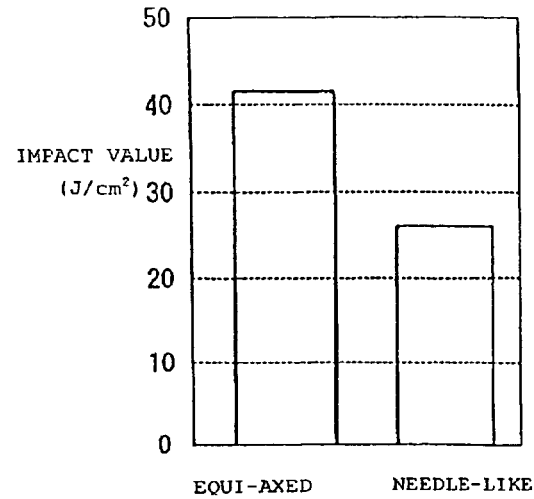
Figure 6C:
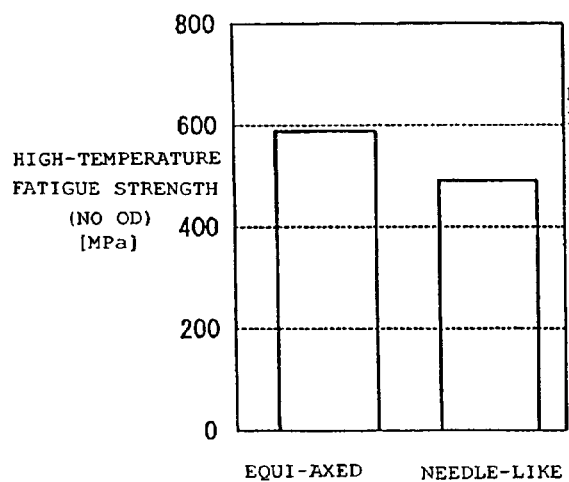
Figure 6D:
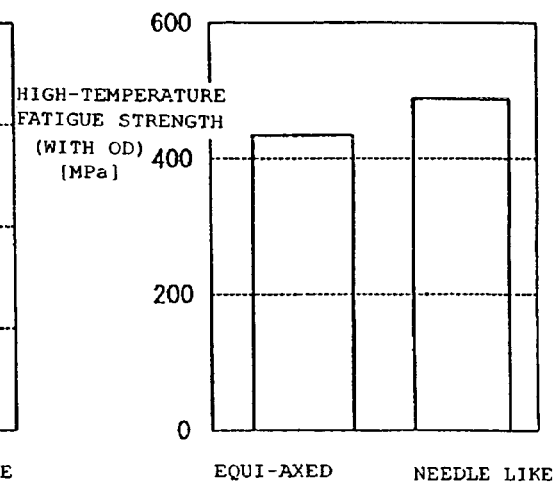

In this example, the engine valve according to the invention is manufactured via a rod-member forming step S1, a forging step S2, a heat-treating step S3, a machining step S4, and an oxidizing step S5 as shown in FIG. 5.

Of these steps, in the rod member forming step S1, a rod formed of titanium alloy is cut into a predetermined length, and a rod member which is eventually formed into the engine valve is manufactured. The titanium alloy Ti-5.8Al-4Sn-3.5Zr-0.7Nb-0.5Mo-0.35Si, for example, is used. This is a titanium alloy of α+β type having the equiaxed texture.

In the forging step S2, an end of the rod member is hot-forged at a temperature lower than the β transformation point (1045° C.), the bevel section is formed at an end of the rod member which serves as the stem section, and then annealing is performed for correcting deformation.

In the heat-treating step S3, by applying high-frequency induction heating to the portion from the bevel section to the medial part of the stem section at a temperature exceeding the β transformation point (1045° C.), the heated portion is converted into the needle-like texture.

In the machining step S4, the stem section and the bevel section are finished into a final shape by cutting and grinding processes.

In the oxidizing step S5, the valve is heat-treated in the ambient atmosphere to apply the oxygen diffused (OD) treatment on the surface thereof.

Results of measurement of mechanical characteristics of the stem section having the equiaxed texture and the bevel section having the needle-like texture of the engine valve manufactured as described above are shown in FIG. 6.

Out of respective graphs shown in FIG. 6, (a) shows a breaking elongation, (b) shows an impact value, (c) shows a high-temperature fatigue strength before oxygen diffused treatment, and (d) shows a high-temperature fatigue strength after the oxygen diffused treatment.

It is understood from the measured results shown in FIG. 6 that the stem section having the equiaxed texture is larger in breaking elongation and the impact value than the bevel section having the needle-like texture. It is also understood that the high-temperature fatigue strength does not change significantly in the bevel section having the needle-like texture but is relatively lower in the stem section having the equiaxed texture than the bevel section having the needle-like texture by performing the oxygen diffused treatment.

In the engine valve in this example, by providing the boundary between the needle-like texture and the equiaxed texture in the range of sliding movement T in which the valve slides with respect to the valve guide of the stem section, the stress is prevented from being applied intensively to the boundary, and hence reliability is improved.

Since the bevel section is formed at one end of the stem section by hot-forging the titanium alloy having the equiaxed texture before converting the bevel section into the needle-like texture by the high-frequency heating, machining and molding the engine valve are facilitated. Furthermore, since the setting of the boundary between the needle-like texture and the equiaxed texture is easy, productivity can be improved.

By forming the stem section of the equiaxed texture and the bevel section of the needle-like texture, the creep resistance and the fatigue strength at a high temperature, which are required for the engine valve, can further be improved. In particular, by the improvement of the creep resistance of the bevel section, the limit of deformation of the bevel section can be heightened significantly. Also, durability for the cotter or shim on the side of a stem end of the stem section can be improved.

While a working example of the present invention has been described above, the present invention is not limited to the working example described above, but various design alterations may be carried out without departing from the present invention as set forth in the claims.

What is claimed is:

1. An engine valve adapted to be slidably supported within a valve guide, the valve guide disposed within a cylinder head of an engine, the engine valve comprising:
   a stem section, and
   a bevel section provided at one end of the stem section, the stem section and the bevel section formed integrally of titanium alloy,
   wherein:
      a portion of the valve from the bevel section to a medial part of the stem section is formed of a material having a substantially acicular texture,
      a portion of the valve from the medial section to the other end of the stem section is formed of a material having a substantially equiaxed texture, and
      a boundary between the acicular texture and the equiaxed texture is provided in an area of the stem section adapted for sliding movement relative to the valve guide.

2. The engine valve according to claim 1, wherein the valve is a product of a process of hot-forging a titanium alloy, formed mainly of the equiaxed texture, at a temperature not exceeding a β transformation point to form the bevel section at one end of the stem section, and heating a portion from the bevel section to the medial part of the stem section with high frequency induction heating at a temperature exceeding the β transformation point to form the acicular texture in that portion.

3. The engine valve according to claim 1, wherein the stem section comprises an area S which confronts an interior surface of the valve guide over the range of sliding movement of the valve with respect to the valve guide, and
   wherein the area S comprises an area Scl and an area Sop, the area Scl comprising the portion of the area S confronting the interior surface of the valve guide when the valve is in a closed position, and the area Sop comprising the portion of the area S confronting the interior surface of the valve guide when the valve is in an open position,
   and wherein the boundary between the acicular texture and the equiaxed texture is disposed in the area Scl.

4. The engine valve according to claim 3, wherein an area S' comprises the area corresponding to the overlap of the area Scl and the area Sop, and wherein the boundary between the acicular texture and the equiaxed texture is disposed in the area S'.

5. The engine valve according to claim 1, wherein said valve is formed from a titanium alloy comprising a material selected from the group consisting of
   Ti-6Al-2Sn-4Zr-1Nb-1Mo-0.2Si, Ti-6Al-2Sn-4Zr-2Mo, Ti-2.7Sn-4Zr-0.4Mo-0.45Si,
   Ti-8Al-1Mo-1V, Ti-5.8 Al-4 Sn-3.5 Zr-0.7 Nb-0.5 Mo-0.35 Si, and Ti-72SiCN.

6. A cylinder head for use as a component of an internal combustion engine, the cylinder head comprising:
   a cylinder head casting having a plurality of intake ports and a plurality of exhaust ports formed therein;
   a plurality of valve seats fixedly disposed in said casting for respectively receiving respective bevel sections of respective exhaust valves therein,
   a plurality of valve guides fixedly disposed in said casting for respectively receiving respective stem sections of respective exhaust valves therein, a plurality of engine valves slidably disposed in said valve guides within said casting, each of said engine valves comprising:

a stem section, and a bevel section provided at one end of the stem section, the stem section and the bevel section formed integrally of titanium alloy, wherein a portion of the valve from the bevel section to a medial part of the stem section is formed of a material having a substantially acicular texture, a portion of the valve from the medial section to the other end of the stem section is formed of a material having a substantially equiaxed texture, and a boundary between the acicular texture and the equiaxed texture is provided in a range of sliding movement of the valve stem relative to the valve guide.

7. The cylinder head of claim 6, wherein said valves are formed from a titanium alloy comprising a material selected from the group consisting of Ti-6Al-2Sn-4Zr-1Nb-1Mo-0.2Si, Ti-6Al-2Sn-4Zr-2Mo, Ti-2.7Sn-4Zr-0.4Mo-0.45Si, Ti-8Al-1Mo-1V, Ti-5.8 Al-4 Sn-3.5 Zr-0.7 Nb-0.5 Mo-0.35 Si, and Ti-72SiCN.

8. The cylinder head of claim 7, wherein the titanium alloy is Ti-5.8 Al-4 Sn-3.5 Zr-0.7 Nb-0.5 Mo-0.35 Si.

9. The cylinder head of claim 6, wherein the valves are respective products of a process of hot-forging a titanium alloy, formed mainly of the equiaxed texture, at a temperature not exceeding a β transformation point to form the bevel section at one end of the stem section, and heating a portion from the bevel section to the medial part of the stem section with high frequency induction heating at a temperature exceeding the β transformation point to form the acicular texture in that portion.

10. The cylinder head of claim 6, wherein the stem section comprises an area S which confronts an interior surface of the valve guide over the range of sliding movement of the valve with respect to the valve guide, and wherein the area S comprises an area Scl and an area Sop, the area Scl comprising the portion of the area S confronting the interior surface of the valve guide when the valve is in a closed position, and the area Sop comprising the portion of the area S confronting the interior surface of the valve guide when the valve is in an open position, and wherein the boundary between the acicular texture and the equiaxed texture is disposed in the area Scl.

11. The cylinder head of claim 6, wherein an area S' comprises the area corresponding to the overlap of the area Scl and the area Sop, and wherein the boundary between the acicular texture and the equiaxed texture is disposed in the area S'.

12. The cylinder head of claim 6, wherein said plurality of engine valves comprise exhaust valves.

13. The cylinder head of claim 6, wherein said plurality of engine valves comprise intake valves.

14. The cylinder head of claim 6, wherein said plurality of engine valves comprise both intake valves and exhaust valves.

* * * * *